(12) United States Patent
Poeting (10) Patent No.: US 7,142,942 B2
(45) Date of Patent: Nov. 28, 2006

(54) METHOD OF PRODUCING A DESIGN ON A TERRACOTTA CONTAINER HAVING A GLAZED SURFACE PORTION

(76) Inventor: Rolf Poeting, 120 Richland La., Pittsburgh, PA (US) 15208

( * ) Notice: Subject to any disclaimer, the term of this patent is extended or adjusted under 35 U.S.C. 154(b) by 17 days.

(21) Appl. No.: 10/874,143

(22) Filed: Jun. 22, 2004

(65) Prior Publication Data

US 2005/0282469 A1    Dec. 22, 2005

(51) Int. Cl.
*B24B 49/00* (2006.01)
*B24B 51/00* (2006.01)

(52) U.S. Cl. .......... 700/157; 700/164; 451/5; 451/41

(58) Field of Classification Search .......... 700/157, 700/164; 451/5, 41
See application file for complete search history.

(56) References Cited

OTHER PUBLICATIONS

"Glaze, Stone, Glass Engraving and Etching" webpage. Printed from http://www.truebite.com/, unchanged since 2001 confirmed with wayback machine, archive.org.*
"PÖTING Cutting Machines", "PÖTING Cutting Robot", and "PÖTING Wincut PRO" webpages. Printed from htp://www.Poeting.de/. Unchanged since Feb. 2002 confirmed with wayback machine, archive.org.*

* cited by examiner

*Primary Examiner*—Leo Picard
*Assistant Examiner*—Michael D. Masinick
(74) *Attorney, Agent, or Firm*—Nils H. Ljungman & Associates (57) ABSTRACT

This invention relates to a method of producing designs on terracotta containers, the surfaces of which have been at least partly covered with a glaze. In the method, the glaze is cut through and is cut, grinded, or etched away with glass cutting tools to expose the terracotta surface beneath. The glaze is removed to produce a design or pattern on the surface of the container to enhance the visual appeal and aesthetics of the container. Portions of the terracotta material may also be removed during the cutting process to produce a grooved design in the surface of the container.

14 Claims, 4 Drawing Sheets

ROOSTER

FLOWERS W/BUGS

FIG. 1A

PINECONE

FIG. 1B

ROOSTER

FIG. 1C

MOOSE W/TREES

FIG. 1D

METHOD OF PRODUCING A DESIGN ON A TERRACOTTA CONTAINER HAVING A GLAZED SURFACE PORTION

BACKGROUND OF THE INVENTION

1. Field of the Invention

This invention relates to a method of producing designs on terracotta containers, the surfaces of which have been at least partly covered with a glaze. In the method, the glaze is cut through and is grinded or etched away with glass cutting tools to expose the terracotta surface beneath. The glaze is removed to produce a design or pattern on the surface of the container to enhance the visual appeal and aesthetics of the container.

2. Background Information

Flowers and plants are common decorative elements in environments ranging from business offices to homes. Some type of container, such as a vase, a basket, or a pot, is of course required to hold flowers and plants, especially in indoor settings. Since the flowers or plants are used to accomplish a decorative purpose, it is therefore often the case that the appearance of the flower or plant container is as important as the flower itself for the purpose of matching the decor of the room and to produce a desirable visual and aesthetic appeal.

One type of container that can be used is a terracotta pot. The terracotta pot has a somewhat plain surface that can be covered with a glaze to enhance the visual appearance. To further enhance the appearance, decorative designs can be produced in or on the glaze. The designs can be of virtually any type, including patterns, pictures, images, and outlines.

OBJECT OF THE INVENTION

It is an object of the present invention to create a design on a terracotta container using an innovative method of cutting through and removing portions of the glaze which covers a portion of the surface of the container with diamond glass cutting tools.

SUMMARY OF THE INVENTION

In an embodiment of the present invention, a terracotta container, such as a container for holding plants or flowers, is at least partly covered with a glaze, such as a colored glaze. The glaze could then have decorative cuttings etched therethrough using a glass cutting tool to expose the terracotta surface beneath. In this manner, the terracotta surface produces a design by contrast with the colored glaze around the design.

In another embodiment of the present invention, portions of the glaze and portions of the terracotta surface can both be removed during the cutting or grinding process. The glass cutting tool can cut a groove into the surface of the terracotta container to produce a design.

In another embodiment of the present invention, the terracotta container is a terracotta flower pot.

In another possible embodiment of the present invention, the containers could be made of a material other than terracotta, such as stone, clay, ceramic, porcelain, or any number of other hard or hardened materials suitable for use as containers. The glaze added to the container could be of any color or glazing material.

In another possible embodiment of the present invention, the containers could preferably be cut using a Pöting glass cutting machine, such as models SM4 or SM8. The Pöting Cutting Machines are made by Pöting GmbH & Co KG, located at Freiheitstrasse 8a, 40699 Erkrath (Germany), Phone +49 211 90003-0, Fax +49 211 90003-22, Email poeting@poeting.de. at www.poeting.de. The Pöting Cutting Machines SM4 and SM8 are computer-controlled decoration cutting machines for the production of cut glassware such as stemware, tumblers, vases, plates, glass dishes, and pottery. The machines have an automatic changing of inclination of glass axis depending on glass shape, assuring that cutting wheels are always in vertical position to the glass surface, thus obtaining equilateral profiles of cuts even when the glass shape is convex or concave.

The machines type SM4C/CC and SM8C/CC are designed for the decoration of round glassware, while the machines SM4D/DD and SM8D/DD additionally offer the possibility to decorate plane surfaces on squared vases, bottles or carafes with free cut-designs. Regular or irregular polygonal glass bodies can be treated as well as light pyramidal formed glasses. The machines are equipped with CAD/CAM software WINCUT PRO. This sophisticated software covers the complete range from design to the production of cut glassware.

Pöting's Decoration Cutting Robot SM-R, for the Cutting and Decoration of high quality glass articles with up to 4 kgs article weight and a size of 300 mm in diameter and 300 mm in height, could also be used to produce designs on terracotta containers. Larger articles can also be decorated, but with some restrictions. Round, square or oval glass articles can be cut. The basis of this type of decoration cutting machine consists of a standard Kawasaki industrial robot with special coverings protecting against the cutting water. The machine's inside is supplied with compressed air in order to create a pressure within the unit. Cutting water and cutting grinds are therefore not able to penetrate the machine body. The machine is equipped with one precision cutting spindle. The cutting pressure can be directly programmed via the WINCUT PRO software.

All existing elements of the decoration cutting machines SM 4/8 and SM-M, such as cutting spindles, quick-change flanges and pneumatic wrenches can of course also be used for the Decoration Cutting Robot SM-R.

The line is made for connection to the central cutting water recycling system and it is equipped with an electrically operated entry valve for the water. The waste water tube must be connected to a cleaning device with centrifuge, because the diamond grind and glass waste deteriorate the cutting result of the line. The machine and the cutting trestle are installed on a solid ground base and are aligned to each other during assembly. The cutting water is collected in a stainless steel tank and is guided to the waste water collection tube. The cutting pressure is sent to the unit by means of an electro-pneumatic converter corresponding to the programmed values.

The Decoration Cutting Machines of the SM-R Series take the article at one or several pre-determined take-up points. The take-up can either be made by an injector suction unit or by vacuum, or it can even be made by a gripper unit. When the article is fixed, it is automatically moved into the cutting position and the cutting program starts.

All program groups that are known from the existing Decoration Cutting Machines of types SM4, SM8 or SM-M can be exploited also in this cutting robot. All cuts that are executed on existing Pöting Series Decoration Cutting Machines can be treated with the WINCUT PRO Software and can also be cut on the SM-R Series Machines. This direct connection via the WINCUT PRO software makes it possible to exploit all Decoration Cutting Machines according and in direct connection to the market. The minimum series can be realized on the Decoration Cutting Robot SM-R, and medium and large orders can be produced on the standard Decoration Cutting Machines of SM4, SM8 or the modular SM-M series.

Instead of only one precision decoration spindle, also the double spindle head of the SM-M series can be installed in this machine. This creates the possibility to decorate an article with up to 4 different cutting spindles per design. Two pneumatic pistons serve to switch the respective cutting wheels in place and the robot guides the glass article against the respective cutting wheel on the spindle.

As a further option, both cutting devices can be installed several times and be arranged centered around the axis of this robot. Consequently the number of the tools to be used is almost unlimited.

In addition to the cutting device, also a device for engraving can be installed. A pneumatic engraving tool serves for taking-up the standard tools for glass engraving.

Pöting has approved Horus Computer's WINCUT PRO Decor Designer for use with their complete range of computer controlled glass cutting machines SM4/8 (C, CC, D, DD and special). WINCUT PRO is a CAD/CAM programme running under the Windows NT operating system and directly controls all stages of decor design and production which are in use on Pöting Decoration Cutting Machines.

As a plug-in replacement for WINCUT 1 and VDT 512 based systems, all existing designs for round, flat and bottom surfaces may be directly imported and used without the user having to make any changes to the design data. Files from VDT 512 formatted disks can be read directly into the system.

Some of the main features of the WINCUT PRO software include 3D decor design directly on the surface of the glass; round, flat and bottom cuts within the same design; six level hierarchical data structure; translation, rotation, scaling and mirroring of objects; online checking of the design for machine compatibility; stringing of curves and lines to chained cuts; automatic smoothing of intercut steps; real time movement of the design in 3D; and different import formats.

To cut a pattern into glass or ceramic articles, the machine uses a six-axis controller. Five axes control the work piece, and the remaining one axis controls the tool. The work pieces, loaded four or eight at a time, are held by vacuum on "chucks", which are mounted on a "table". The chucks can rotate around their length axis. The chucks can also pivot vertically. The table can move back and forth, left and right, and up and down. The tools, which in one embodiment are diamond wheels, can swivel around their vertical axis.

All six axes move by a mathematical defined path, which is controlled by a computer. The work piece is moved along the tool to create the desired pattern. The tool and the straight or curved surface of the work piece are always in a vertical position with each other. This assures a symmetric cut appearance at any point of the surface. The selected cutting speed is constant along the work pieces' surface, i.e. the tool travels over the work piece at a constant speed, regardless of its diameter and curvature.

The work piece is pressured against the tool with controlled air pressure, which compensates for the variations in the work pieces, assuring a consistent pattern even with uneven and off round glasses or ceramic vessels.

To utilize the machine, the machine operator loads four or eight work pieces into the machine and then pushes the start button. The machine window closes, the cooling water starts, the cutting tools start spinning, and the programmed pattern is then cut into the glass or ceramic work piece. When completed, the window opens and the operator removes the finished products for final washing and packing.

The above-discussed embodiments of the present invention will be described further hereinbelow. When the word "invention" is used in this specification, the word "invention" includes "inventions", that is the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

Figure 1A:
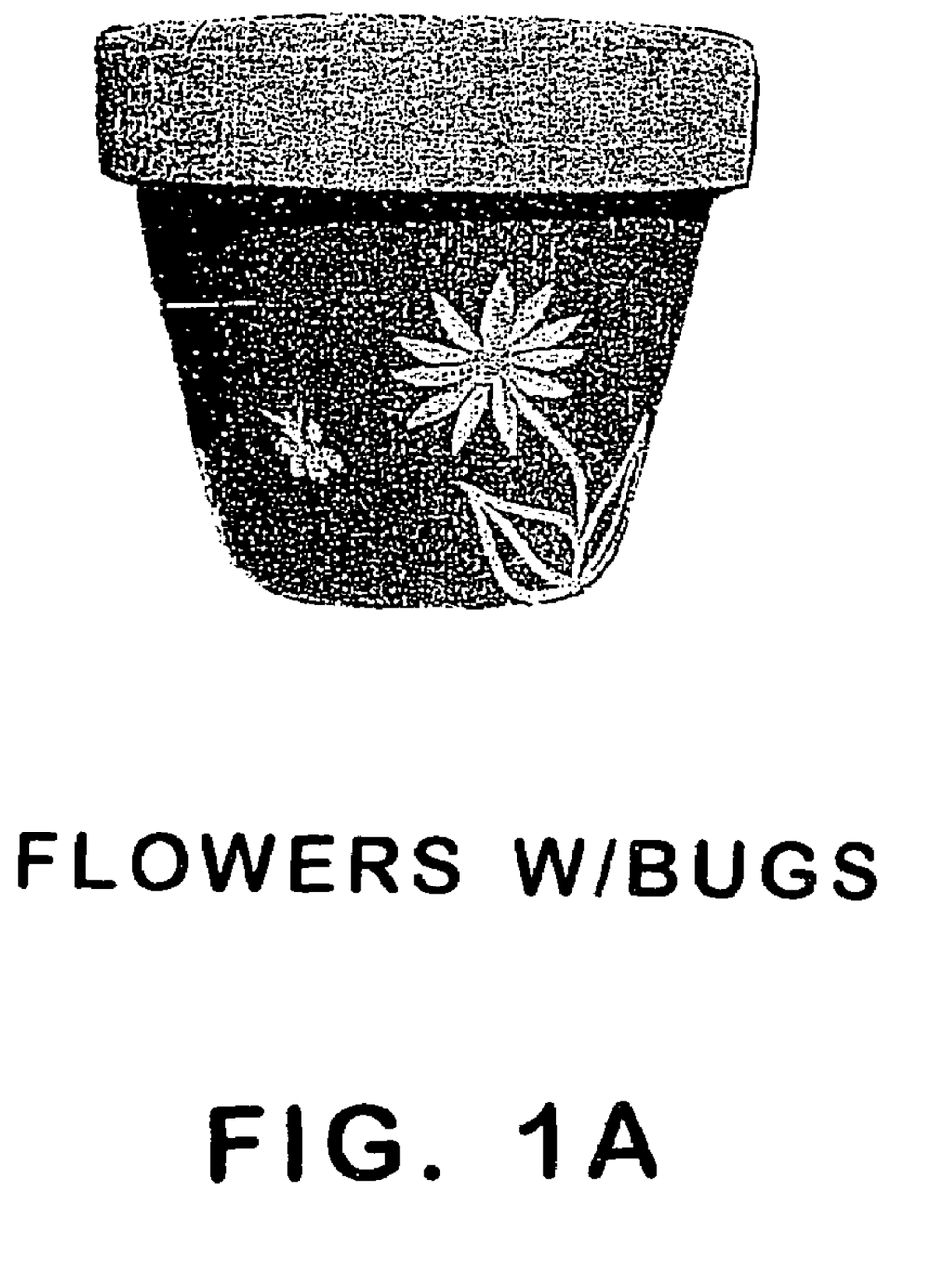
FIGS. 1A to 1D show examples of glazed terracotta pots with designs engraved thereon by a method according to at least one possible embodiment.
Figure 1B:
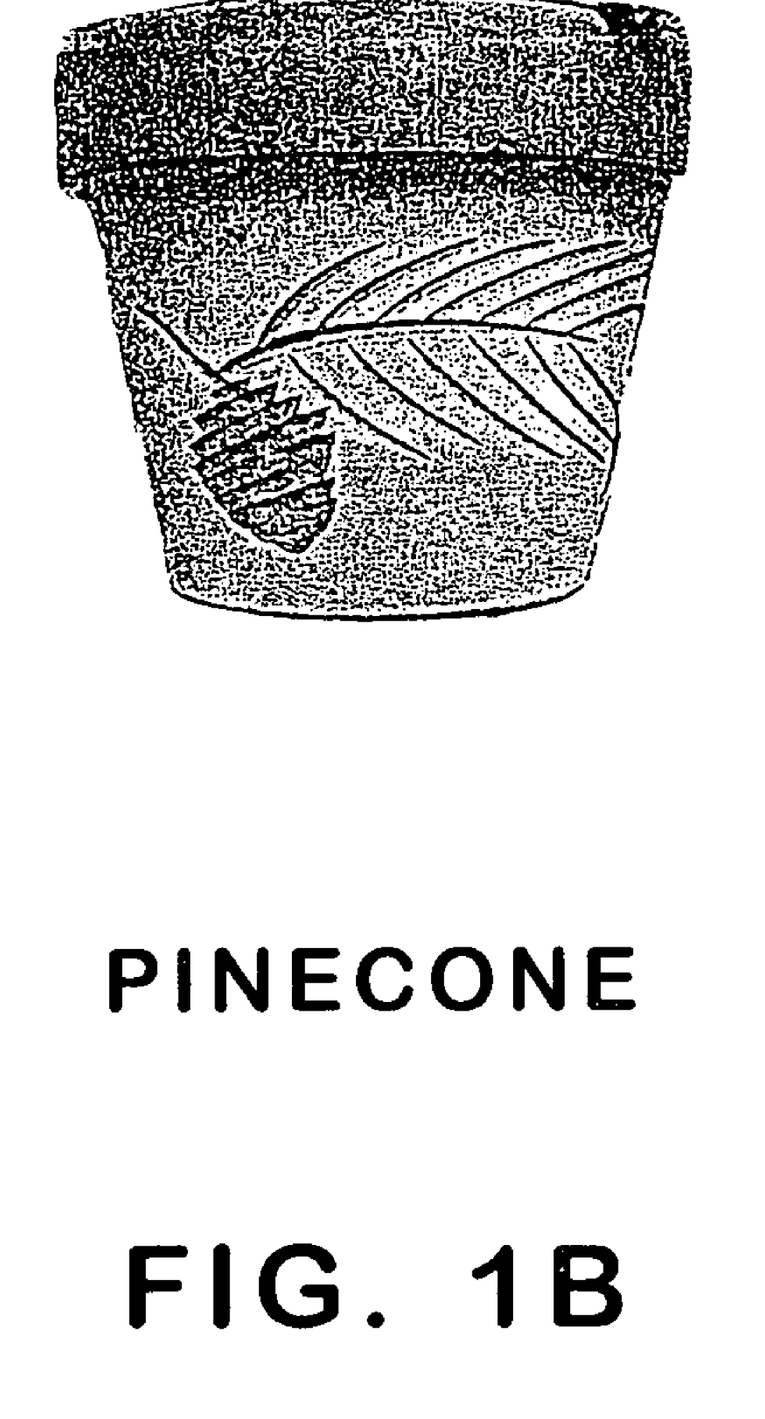
Figure 1C:
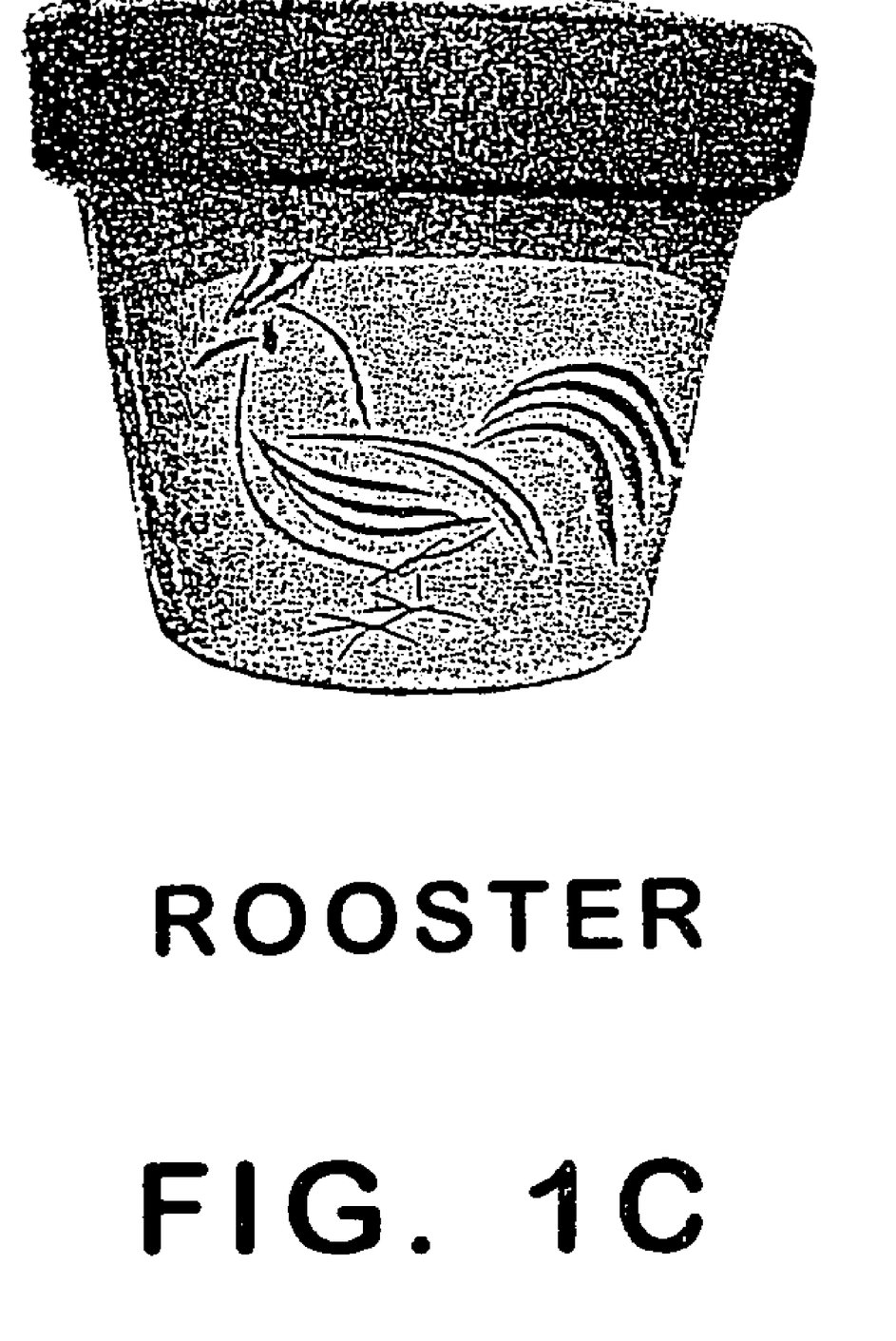
Figure 1D:
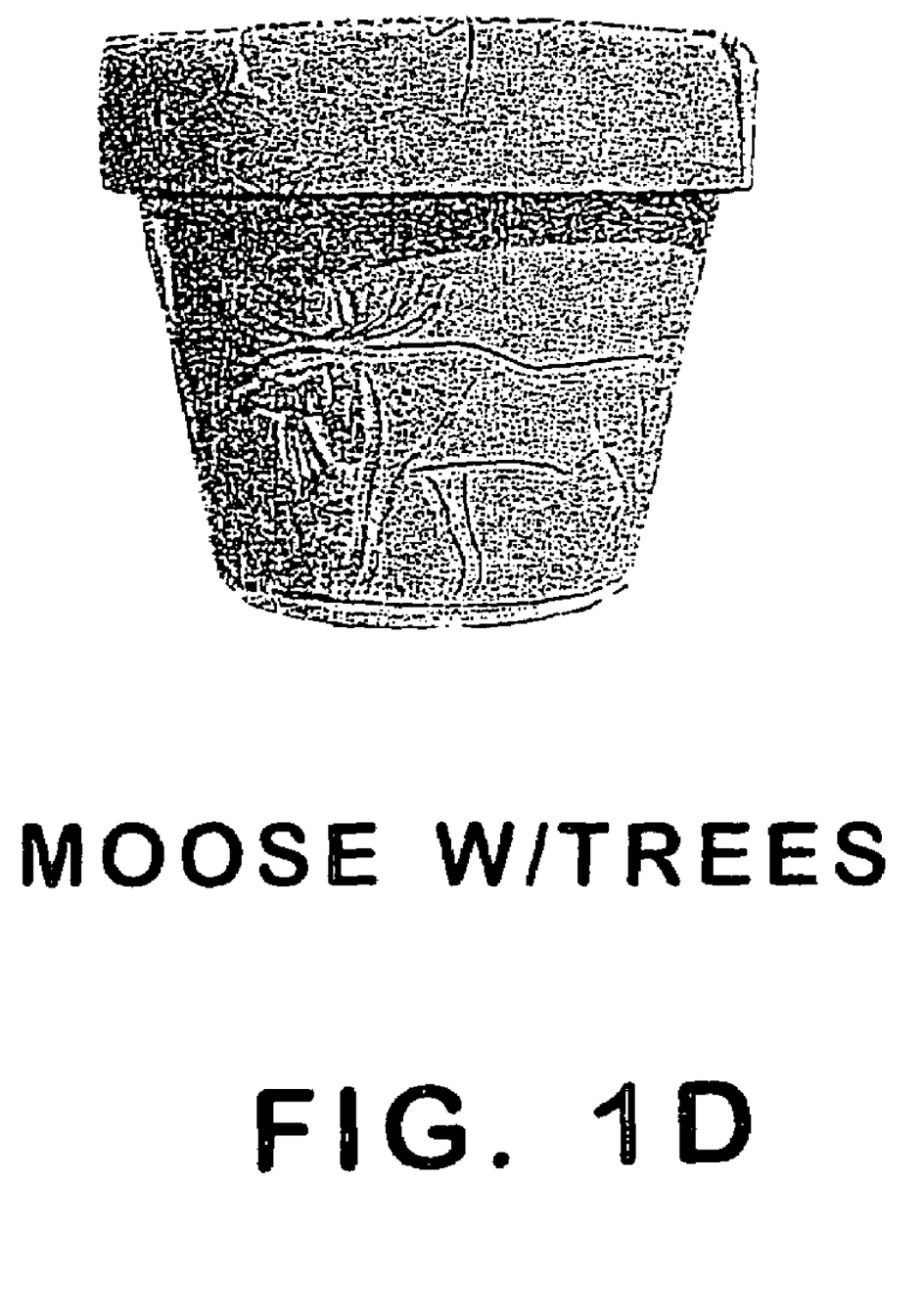

A variety of pots or similar containers for storing and housing a variety of plants are conventionally known. A typical "flower pot" assembly includes a pot and a tray. The bottom of the pot rests on the upper surface of the tray, adding to both the aesthetic appeal and the overall stability of the flower pot assembly. Additionally, the tray serves to collect water, dirt and portions of the plant if and when they fall out of the pot, reducing the amount of spillage of materials.

Although such flower pots are well known, such conventional flower pot assemblies include a number of limitations. For example, it is often desirable to place the pot in a number of different positions relative to the tray. In particular, there are occasions where it is beneficial for the user to lock the pot in place relative to the base, adding to the overall stability of the flower pot. At other times, however, the user may desire to fix the position of the pot without "locking" the pot in position, such as when the user may have to remove the pot from the tray on a regular basis. On other occasions, the user may not want to fix the position of the pot at all relative to the base. Although many conventional flower pot assemblies may be able to accommodate one of these positions, it is desirable to have a flower pot that can accommodate all of the positions.

Another limiting feature of conventional flower pot assemblies is the lack of an ability to "mix and match" different flower pots with different trays. Because many flower pot trays have idiosyncratic ridges, grooves, depressions or projections on at least one surface thereof, the use of a base with an unassociated flower pot often will result in an unstable arrangement, increasing the likelihood that the pot will tip over.

In the craft of clay pottery, some of the most popular designs include various shapes and sizes of flower pots. It is common for the pots to be equipped with handles, pockets and other decorations which may serve functional or merely decorative purposes. One of the popular commercial designs for pottery is a large pocket "strawberry" jar. The jar is used primarily for planting strawberry plants but may be used for planting a variety of other plants. For this purpose the jar is equipped with a number of pockets which extend outward from the body of the jar and allow a space for filling in potting soil and planting a plant. Also, additional plants can be located in the main body of the jar.

The standard method for making a large pocket strawberry jar is to first throw the clay on a pottery wheel into a large cylindrical shape. The outline of the jar is usually tapered inward to form a neck and then tapered back outward. At the top edge of the jar the shape is finished with an outer rim. The pockets are added onto the thrown shape with additional clay which is hand molded. First, an oval hole is cut into the side of the raw jar and then the pocket is formed by hand and then attached to the jar. Attaching the separate piece of clay to the jar requires care to make sure that the joints between the jar and the pockets are formed properly. Also, the moisture content in the additional clay piece must be at a level appropriate for the moisture content in the jar to prevent problems from different reactions to the heat of the kiln.

The prior art provides various methods for forming ceramic tiles for architectural applications, and it also provides various glaze compositions which are used to produce the top surface or wear surface of the tile.

Generally, the formation of a ceramic tile involves the steps of forming a raw tile or an unfired ceramic body. Such ceramic bodies are formed from batches of natural or synthetic raw materials such as clay, kaolin, feldspar, wollastonite, talc, calcium carbonate, dolomite, calcined kaolin, oxides such as alumina, silica, corundum and mixtures of the foregoing. Binders and other additives may also be employed to increase the raw mechanical strength of the body.

Once formed, the bodies are fired to form a biscuit that is hard, tough and brittle. In many instances, a glaze composition is applied to the biscuit and given a further firing (double firing) in order to vitrify or sinter the glaze, depending upon the degree of firing. Upon firing the glaze develops a vitreous, transparent or opaque surface that can be glossy or dull (matte), or somewhere in between glossy and dull. Glazes generally comprise one or more glass frits, fillers, pigments and other additives.

In addition to double firing, it is well-known in the prior art to produce tiles by a single fire approach. In the single fire approach, the glaze is applied to the raw ceramic body, and the body and the glaze are then subjected to a single firing operation in order to produce the finished tile.

Hydrophobically modified hydroxyethylcellulose is known from U.S. Pat. No. 4,228,277 to be a clear effective thickener in latex paint compositions and shampoos. Since the time of the initial discovery of these associative thickeners, additional applications have been discovered such as paper coating compositions, etc.

Ceramic greenware can be decorated and coated with a variety of glazes prior to firing. When sanitary ceramic articles are produced, the glaze must meet the same exacting requirements as for decorative ceramic articles. Sinks and toilets must be fired using glazes meeting sanitary requirements and be suitable for extended service.

Cellulose ethers and xanthan gums have been used as thickeners and binders for such sanitary ceramic glazes. Upon firing, these polysaccharides decompose and form the glaze glass and metal oxide deposit on the ceramic article. Varial.RTM. ceramic glaze, for example, is a blend of approximately 20% xanthan gum with 80% sodium polyphosphate, available from Chemische Werk Tubingen of Germany.

A particularly useful sanitary ceramic glaze comprises feldspars, clays, kaolin, quartz metal oxides and frits all together called ceramic raw materials. These ceramic raw materials are suspended in water and stabilized by a mixture of xanthan gum and sodium polyphosphate. Yet even with its advantages and demonstrated utility there were problems of high cost and limited workability. It remained for the present invention to provide a high value in use of sanitary ceramic glaze which could overcome the disadvantages of the prior art.

Conventionally, a glaze composition is known as the composition for remarkably enhancing the surface smoothness of a ceramic substrate. The glaze composition is provided with heat accumulating, electric insulating and other superior vitreous properties. These properties are utilized by thermal heads and various other parts.

(1) The glaze composition, superior in surface smoothness, for thermal heads generally included an alkaline metal and lead, which raises the manufacturing efficiency of the glaze composition.

(2) Recently, a glaze composition for a high-speed or photographic printing thermal head was composed mainly of thermally resistant silicon dioxide, without including an alkaline metal or lead. Such a high-temperature glaze composition was disclosed in, for example, Japanese Examined and Published Patent Application Nos. 60-55453 and 61-24345, and Japanese Laid-open Patent Application No. 60-118648.

Nowadays glaze compositions are developed for use in chips in addition to the thermal heads. To meet the demands for light, thin, short, small but highly-precise electronic parts, a ceramic substrate with a glaze layer formed on the surface thereof is replacing conventional chip substrates. This glazed substrate has a superior surface smoothness, and thin or thick film patterns can be formed on the surface of the substrate with fine pattern pitches.

If the aforementioned conventional glaze composition (1), containing a large amount of alkaline metal and lead is used for a chip substrate, at the time of the application of voltage the alkaline metal decreases the electric insulation while moving through glass, thereby deteriorating electric reliability. When the glaze composition is burnt in a reducing atmosphere, the reduction of lead oxides turn glass black and the high electric insulation, i.e. a specific volumetric resistance of $10^{14}$ .OMEGA.cm or more, cannot be maintained. In addition, the use of lead is undesirable because lead is a toxic substance.

The aforementioned high-temperature glaze composition (2) mainly composed of silicate was developed so as to pursue the high heat resistance. If the thermal expansion coefficient of the composition fails to coincide accurately with that of the ceramic substrate, the ceramic substrate would warp. Since the high-melting glass requires a high fixing temperature when formed integrally on the substrate, even a slight difference of the glass from the substrate in the thermal expansion coefficient would cause the substrate to warp. Since the ceramic substrate requires a sufficient thickness for withstanding such warping, a desirably thin chip substrate is difficult to be formed.

At the time of glaze burning, the high-melting glass develops such a high viscosity that the end portions of glaze composition become remarkably protuberant relative to the entire thin glaze composition. This is not disadvantageous for partial glazing, but provides insufficient smoothness to the entire surface cover or band-shaped glaze patterns to be formed on the chip substrate.

The thermal resistance of the glazed substrate is an essential property for thermal heads, but is an unnecessarily quality for thin-film hybrid parts. The glazed substrate for the hybrid parts needs to be calcined in high temperatures. Therefore, a glazed substrate having a high thermal resistance is uneconomical for use of the thin-film hybrid parts.

The desired glaze thickness of the glazed substrate for thin-film hybrid parts is between about 5 .mu.m and about 25 .mu.m, while that of the conventional glazed substrate for facsimile thermal heads is between 60 .mu.m and 80 .mu.m. When a conventional glaze composition is made thin and the glazing viscosity is high, the composition is influenced by the irregular surface of the ceramic substrate. Therefore, the glaze composition provides insufficient surface smoothness. Such deterious change of the glaze face is undesirable. These days a glaze composition which can provide a very thin and flat but high-quality glaze face is demanded.

Lead containing glazes and enamels for use on ceramic bodies are well-known in the ceramic art. Such glazes and enamels generally comprise a vehicle and one or more glass frits. A glaze is typically thought of as a clear coating, whereas an enamel is a glaze which contains a pigment or similar particles in suspension. Such glazes and enamels are applied to the surfaces of a green, partially, or fully fired ceramic body in the form of a paste. After application of the glaze or enamel to the surface of the ceramic body by silk screening or other conventional techniques, the coated ceramic body is fired to cure the ceramic body, bond the glaze or enamel to the surface of the ceramic body, and volatilize the vehicle.

In the past, the use of lead oxide in these compositions served to lower the fusing point of the frit and to render an acid/alkali resistant finish. Recent efforts have been made at retaining the low fusion temperature of these glazes and enamels and the acid/alkali durability of the coating, but with the removal of the lead oxide.

For several reasons the development of lead free glazes with the appropriate properties to match the properties of the ceramic ware to which they are to be applied is a very desirable commercial goal. First, occasional episodes of lead poisoning have resulted from the use of improperly formulated and fired lead-containing glazes on ceramic ware. Whilst lead-containing glazes can be prepared which are safe and meet current requirements for permissible lead release to food with which they come into contact, the problem of lead poisoning is avoided if lead is avoided. In addition, various pollution controls regarding the use of lead and limits on the content of lead in waste water can be avoided by the use of lead-free glazes.

In the ceramic art a glaze is typically defined as a transparent or opaque glassy coating fired onto a ceramic article or a mixture of ingredients from which the coating is made. Glazes are of two main types, "raw" or "fritted".

"Raw" glazes are typically composed of a mixture of finely ground insoluble beneficiated natural materials—minerals and rocks such as china clay and nepheline syenite. Raw glazes are typically used at high firing temperatures (>1150.degree. C.) on substrates such as porcelain (1300.degree. C.)

"Fritted" glazes are those where all or part of the ingredients have been prefused and quenched to form one or more frits. The frits are ground and mixed with other constituents (natural materials such as china clay) to formulate the final glaze composition.

Fritting is usually carried out, amongst other reasons, in order to improve homogeneity and to render water soluble or toxic constituents insoluble. Fmitted glazes are currently usually used for ceramic ware fired below 1150.degree. C.

Ceramic ware falls into a variety of different categories, each with its own characteristic mix of thermal and mechanical properties. Consequently, before one considers any additional requirements such as appearance or durability, thermomechanical characteristics (glaze maturation temperature and thermal expansion) alone dictates that one glaze will not suffice for all substrates. Each type of substrate requires its own type of glaze.

Furthermore, glaze formulations are frequently tailored not only to match a given type of ceramic ware but also the precise conditions under which it will be fired. The glaze will often have been formulated and modified to yield ware of the desired appearance and appropriate physical properties when fired over a specific schedule in a known kiln. It is not uncommon in the ceramics industry to find glazes which are not only unique to a specific manufacturer, but also unique to one of his production kilns. Hence, the ceramics industry uses and has need of a very wide range of glaze formulations.

A durable lead free low melting, low viscosity high refractive index glaze adaptable to a wide range of firing conditions, so characteristic of lead based glazes, has long been sought by the ceramics industry.

In cutting methods similar to a method for the laser-beam cutting of hollow glass articles, for example the blowing cap of blow-moulded articles such as tumblers, the incision is made by mechanical devices carrying grinding wheels, points or similar cutting members. With the known methods and devices of the aforesaid type, an incision of constant depth along the entire circumferential cutting line is not always obtained.

Non-uniform incision of the articles sometimes makes it impossible to cut the article by "temperature change" during the next heating stage, and at other times results in an extremely irregular cut. Hence the article must often be either rejected or undergo costly and lengthy smoothing.

Other cutting methods and devices are also known in which a laser is used for cutting. For example, DE-OS-3546001 describes a method in which the glass region to be cut is firstly maintained at a high temperature, slightly below the softening point, after which this region is exposed several times along the division line to a laser beam, while a traction force simultaneously acts on that part of the article to be removed. This method is relatively complicated and difficult to implement, mainly for the fact that the force of gravity is generally used as the traction force, this resulting in the need to suitably position the glass to be cut. The cutting line is not sharp and precise, in that the glass is substantially cut by the effect of the laser irradiation.

U.S. Pat. No. 4,467,168 describes a method for cutting glass plates in which a laser is used to make an incision in the glass along the desired cutting line while simultaneously heating said incision region above the glass softening point, after which a gas jet is directed onto the laser focusing region, this gas jet cooperating with the laser to create a fissure in the glass.

The aforedescribed method is claimed for cutting for example brittle plates, but not hollow articles. Moreover it should be noted that the cut in the glass is not obtained by virtue of the stresses generated in the glass but by evaporation-removal, by the combined action of the laser and gas jet, through the entire glass thickness along the incision line. The cut which would be obtained in this manner in the case of hollow glass articles would not be sufficiently sharp, and would require subsequent lengthy and costly machining.

Finally, WO 94/22778 describes a method for cutting hollow glass articles in which the article is rotated at a velocity of about 1 m/sec in correspondence with the cutting line and is heated with a laser such as to generate a region of stress at the required cutting line. In addition, a small crack is made in the article in correspondence with the cutting line. The article is then cooled along the entire circumferential cutting line. This method has proved extremely deficient in the case of glass of non-uniform thickness or of particular geometrical shapes, for example conical. In such a case, as there is not an incision line along the entire circumferential cutting line, the cut is often not sharp and satisfactory.

The process of hand scoring and breaking glass into geometric shapes has been known for more than hundred of years.

Numerous devices to aid this process have been developed. Some early devices, such as Munford, U.S. Pat. No. 325,855, is fully capable of scoring intricate geometric shapes. However, each angle scores would require an individual setup including the positioning of the glass.

The glass cutting machine patented by Mayer (U.S. Pat. No. 1,515,129), although having a circular platen was developed for producing rectangular glass plates in quantity and is limited to 900 angles.

Another group of glass scoring devices have been developed to produce rectangular glass, e.g., R. J. Louviaux et al. (U.S. Pat. No. 2,273,716), W. M. Arck (U.S. Pat. No. 2,812,579), T. W. Macaulay (U.S. Pat. No. 2,845,713), C. H. Moeller (U.S. Pat. No. 3,227,016), but these devices do not have the capability of scoring other than 90.degree. angles.

Another group of glass scoring devices allows the user to score non-linear, free-form shapes by moving the glass by hand under the scoring instrument. The ability to score intricate geometric forms is left solely to the ability of the user, making accuracy, repeatability and production rate very low. An example of this type of device was patented by Mullen (U.S. Pat. No. 4,120,220).

Another group of devices were developed primarily for making circular glass, e.g., Molleger et al. (U.S. Pat. No. 5,044,245), and is incapable of geometric forms with flat or straight sides.

The Able glass scoring device (U.S. Pat. No. 4,497,477) is currently the standard device for use by the small stained glass crafts person. This device, although more versatile in some ways than the first mentioned Munford device, is much more difficult to set up and much less accurate than the Munford device. Set ups, other than 90.degree. are complex and time consuming. Each new score line requires a new setup.

Thus, the prior art has not addressed the need to produce regular and irregular polygon shapes or glass quickly, accurately and repeatedly with a minimum of setups.

The technique of cutting glass by scoring the surface and subsequently breaking it at the score mark has, of course, been known for many years. Over the years, numerous accessories have been developed to assist the operator in effectuating the glass cutting process. Among these have been tables having a specific surface thereon to facilitate the glass cutting operation without scratching the glass surface, guide elements to guide the cutting tool to accurately cut the glass in a straight line, and devices to enable the user to cut small, odd-shaped pieces of glass.

Typical of this latter category of devices is the apparatus shown in U.S. Pat. No. 4,120,220. This apparatus enables a user to cut odd-shaped pieces of glass by disposing a glass cutter in a retaining arm over a work table such that the operator may use both hands to manipulate the glass piece. Alternatively, the glass piece may be secured to the cutting surface and the entire cutting arm moved If the operator so desires. However, this typical apparatus suffers a serious drawback that is shared by virtually all of the prior art devices intended for the home/hobbyist user, that is the collection of glass chips generated by the glass cutter on the work table surface. These chips may cause scratching of the glass surface, injury to the hands of the user, and almost certain inconvenience by the requirement to constantly dean the work table.

The problem of glass chips scratching the surface of the glass that is being cut has long been recognized in commercial glass cutting operations and several solutions have been put forth (see U.S. Pat. Nos. 2,578,919, 2,595,079 and 2,273,716). These solutions have generally involved placing a plurality of longitudinal ridges on the top of the glass cutting table such that the glass pane being cut rests on the top of the ridges and the glass chips fall between the ridges. In the field of commercial glass cutting operations, which generally cuts panes of glass of relatively large size for windows, doors, picture frames, etc., this solution has been perfectly acceptable. However, for the home/hobbyist user has substantially different criteria for cutting relatively small, irregularly shaped pieces of glass for art works than does the commercial business establishment which cuts almost solely rectangular, rather large glass panes. The prior art solutions mentioned above achieve their affect through a table structure having attached thereto, or integrally formed therewith, the plurality of parallel ridges to collect the glass chips. Obviously, for a home user who must often pursue his hobby without benefit of a separate workshop area, a complete table structure having no other use than for cutting lass is not practical. Furthermore, the hobbyist user must cut various small pieces of glass into highly irregular shapes, which is not possible on glass cutting surfaces utilizing a plurality of longitudinal ridges. Even if the ridges were spaced closely enough together to support the glads while being cut, the irregular shapes encountered by the hobbyist user would invariably require a cut parallel to the support ridges. Obviously, this would cause a breakage of the glass if too much pressure on the cutting tool were exerted, and insufficient scoring of the glass if too little pressure were exerted.

One prior art device attaches a surface of rubber having parallel ridges on its cutting side which supports the glass pane. This is also of no benefit to the home-hobbyist user, since the rubber surface with the ridges will deform if cutting small pieces of glass, thereby rendering small pieces impossible.

The prior art is also replete with devices for guiding a glass cutter along a particular path. These have primarily involved guide bars or other devices permanently attached to a cutting surface along edges disposed at right angles to each other. Once again, these are primarily used in commercial glass cutting establishments to accurately and repeatedly cut rectangular, relatively large panes of glass. They are of particular import in this type of establishment since it enables the operator to rapidly cut a straight line over a large area. Some of these prior art devices are adjustable to readily enable the operator to cut rectangular glass panes of various sizes. However important these devices may be to the commercial business establishment, they are of virtually no use to the home/hobbyist user.

Another type of device for cutting glass is that shown in U.S. Pat. No. 4,497,477, however this device is difficult to use as it requires a protractor to measure the angles to be cut on a piece of glass which is laborious and time consuming.

Generally, glass cutting tables of the existing prior art utilize a workpiece support or table with a carriage mounted for movement in an X-Y plane above the table. A cutting head or grinder is mounted on the carriage for cutting or otherwise machining the glass workpiece. Historically, mechanical mechanisms were utilized for moving the carriage such as ball screws or lead screws. In addition to taking up a large amount of space, these prior art mechanical designs do not provide a fast-acting response with accurate positioning.

The prior art has developed several different cutting heads in attempting to address these problems. For example, U.S. Pat. Nos. 3,756,104 and 3,760,997 both disclose a cutting head in a glass cutting machine which is actuated using a constant-reluctance motor. U.S. Pat. Nos. 3,797,339 and 4,012,974 disclose carriages for glass cutting machines in which the cutting tool is moved by a linear induction motor. However, these prior art glass cutting machines fail to provide effective, economical movement of the cutting head in both the X and Y directions.

Linear motor technology has been utilized for various positioning applications and provides high speed, high acceleration and smoothness of motion with a short settling time. Linear servomotors have been available since the early 1980's and have been used in systems such as X-Y graphic plotting devices and inspection applications for circuit boards and the like. Typical linear motors can be supplied by Anorad Corporation. Linear servomotors work essentially the same as rotary motors, but are opened up and laid out flat. In general, each motor is made up of two parts, a set of electrical coils embedded within a coil core and a set of magnets mounted on a steel magnet plate to generate a high magnetic flux. The linear motors require little maintenance in view of the lack of moving parts. However, they do require that the motor be kept clean. This limitation results in linear motors being effectively useful in clean room environments. However, existing X-Y positioning systems or gantry positioning systems would not operate well in even light machining environments.

In the fields of stained and art glass work, glass cutting techniques and devices are critical in view of the intricate glass shapes that are required. U.S. Pat. Nos. 4,939,968; 4,120,220; and 4,446,768 disclose glass cutting devices of various designs. As discussed in these prior art patents, hand tools have often been utilized for glass cutting but hand held glass cutters have significant drawbacks, particularly when cutting complex curves. The various glass cutting apparatus disclosed in the prior art patents simplify some of the difficult aspects in glass cutting. However, these prior art devices do not easily and consistently replicate a glass workpiece according to a given pattern. In general, in the prior art, the shape of the pattern is drawn onto the glass workpiece and the apparatus utilized is used to score the glass along the drawn guideline. However, this technique does not yield a high degree of uniformity in the shape of identically patterned glass workpieces.

One feature or aspect of an embodiment is believed at the time of the filing of this patent application to possibly reside broadly in a method of producing a design on or in an exterior surface of a terracotta container using a glass cutting machine; said exterior surface being at least partly covered with a glazing material; and said glass cutting machine being programmable and controlled by a computer operatively connected to said glass cutting machine to cut said design in said container; said method comprising the steps of:

inputting said design into said computer;

placing a number of containers into said glass cutting machine;

activating said glass cutting machine;

contacting one of said containers with a cutting tool of said glass cutting machine;

cutting said glaze on said exterior surface of said container to remove a portion of said glaze to expose said exterior surface beneath said glaze;

continuing cutting said glaze in accordance with said programmed design to produce said design on said container;

repeating said steps of contacting and cutting for each of said containers until all containers have said design thereon; and removing said containers from said glass cutting machine.

Another feature or aspect of an embodiment is believed at the time of the filing of this patent application to possibly reside broadly in method of producing a design on or in an exterior surface of a terracotta container using a glass cutting machine; said exterior surface being at least partly covered with a glazing material; and said glass cutting machine being programmable and controlled by a computer operatively connected to said glass cutting machine to cut said design in said container; said method comprising the steps of:

inputting said design into said computer;

placing a plurality of containers into said glass cutting machine;

activating said glass cutting machine;

contacting a first container of said plurality containers with a cutting tool of said glass cutting machine;

cutting said glaze on said exterior surface of said first container to remove a portion of said glaze to expose said exterior surface beneath said glaze;

continuing cutting said glaze in accordance with said programmed design to produce said design on said first container;

repeating said steps of contacting and cutting for each of said plurality of containers until all containers have said design thereon; and removing said plurality of containers from said glass cutting machine.

Yet another feature or aspect of an embodiment is believed at the time of the filing of this patent application to possibly reside broadly in the method, wherein said method further comprises the step of:

cutting a portion of said exterior surface of said first container to remove a portion of said exterior surface to form a groove therein, wherein said step of cutting said portion of said exterior surface is performed either:

(A) after removal of said portion of said glaze from said exterior surface; or (B) substantially simultaneously as removal of said portion of said glaze from said exterior surface.

A further feature or aspect of an embodiment is believed at the time of the filing of this patent application to possibly reside broadly in the method, wherein said method further comprises repeating said step of cutting a portion of said exterior surface of said first container to remove a portion of said exterior surface to form a groove therein for each of said plurality of containers until all containers have a groove formed therein.

Another feature or aspect of an embodiment is believed at the time of the filing of this patent application to possibly reside broadly in the method, wherein the container comprises one of: stone, clay, ceramic, porcelain, or any number of other hard or hardened materials suitable for use as containers.

Yet another feature or aspect of an embodiment is believed at the time of the filing of this patent application to possibly reside broadly in the method, wherein said glass cutting machine comprises Pöting glass cutting machine models SM4 or SM8.

Still another feature or aspect of an embodiment is believed at the time of the filing of this patent application to possibly reside broadly in the method, said glass cutting machine comprises a glass cutting robot, such as Pöting's Decoration Cutting Robot model SM-R.

A further feature or aspect of an embodiment is believed at the time of the filing of this patent application to possibly reside broadly in the method, wherein said computer comprises a cutting program to program said glass cutting machine to a cut said design.

Another feature or aspect of an embodiment is believed at the time of the filing of this patent application to possibly reside broadly in the method, wherein said cutting program comprises WINCUT PRO Software.

Some examples of flower pots which may possibly be utilized or adapted for use in at least one possible embodiment of the present invention may possibly be found in the following U.S. Pat. No. 6,510,653, entitled "Flower pot assembly with universal tray;" U.S. Pat. No. D460,717, entitled "Flower pot;" U.S. Pat. No. D460,020, entitled "Hanging flower pot;" U.S. Pat. No. D456,307, entitled "Combined legged flower pot and base;" and U.S. Pat. No. D441,315, entitled "Patio table top flower pot."

Some examples of methods for producing clay pots which may possibly be used or adapted for use in at least one possible embodiment of the present invention may possibly be found in the following U.S. Pat. No. 6,548,438, entitled "Method for processing clay ceramic materials;" and U.S. Pat. No. 5,695,703, entitled "Method of manufacturing clay pots with pockets."

Some examples of glazes which may possibly be utilized or adapted for use in at least one possible embodiment of the present invention may possibly be found in the following U.S. Pat. No. 6,174,608, entitled "Ceramic tile and glaze for use thereon;" U.S. Pat. No. 5,962,353, entitled "High productivity ceramic glaze;" U.S. Pat. No. 5,922,444, entitled "Glaze composition;" U.S. Pat. No. 5,783,506, entitled "Ceramic glaze including pearlescent pigment;" U.S. Pat. No. 5,447,891, entitled "Lead-free glaze or enamel for use on ceramic bodies;" U.S. Pat. No. 5,304,516, entitled "Glaze compositions;" and U.S. Pat. No. 5,256,179, entitled "Method of making a glass-ceramic article having an adherent colored glaze with controlled texture."

Some examples of glass cutting methods or devices for cutting glass which may possibly be utilized or adapted for use in at least one possible embodiment of the present invention may possibly be found in the following U.S. Pat. No. 6,512,196, entitled "Laser cutting device and method for cutting glass substrate by using the same;" U.S. Pat. No. 6,204,472, entitled "Method and device for cutting hollow glass articles by a laser beam;" U.S. Pat. No. 6,202,530, entitled "Glass cutting device;" U.S. Pat. No. 5,791,971, entitled "Glass cutting machine with linear motor;" U.S. Pat. No. 5,558,565, entitled "Glass pattern cutting device;" U.S. Pat. No. 5,535,933, entitled "Glass cutting machine;" U.S. Pat. No. 6,461,470, entitled "Apparatus for etching glass substrate;" U.S. Pat. No. 6,337,029, entitled "Method and composition for etching glass ceramic and porcelain surfaces;" and U.S. Pat. No. 6,281,136, entitled "Apparatus for etching glass substrate."

The components disclosed in the various publications, disclosed or incorporated by reference herein, may be used in the embodiments of the present invention, as well as equivalents thereof.

The appended drawings in their entirety, including all dimensions, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The following patents, patent applications or patent publications, are hereby incorporated by reference as if set forth in their entirety herein as follows: DE 41 14 086; DE 30 28 662; DE 29 24 570; DE 26 23 812; GB 1 533 540; U.S. Pat. No. 5,823,011; U.S. Pat. No. 6,282,922 B1.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The details in the patents, patent applications and publications may be considered to be incorporable, at applicant's option, into the claims during prosecution as further limitations in the claims to patentably distinguish any amended claims from any applied prior art.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, the abstract is not intended to limit the claims in any manner and should not be interpreted as limiting the claims in any manner.

The invention as described hereinabove in the context of the preferred embodiments is not to be taken as limited to all of the provided details thereof, since modifications and variations thereof may be made without departing from the spirit and scope of the invention.

What is claimed is:

1. A method of producing a design on or in an exterior surface of a terracotta container using a glass cutting machine; said exterior surface being at least partly covered with a glazing material; and said glass cutting machine being programmable and controlled by a computer operatively connected to said glass cutting machine to cut said design in said container; said method comprising the steps of:
  inputting said design into said computer;
  placing a number of containers into said glass cutting machine;
  activating said glass cutting machine;
  contacting one of said containers with a cutting tool of said glass cutting machine;
  cutting said glaze on said exterior surface of said container to remove a portion of said glaze to expose said exterior surface beneath said glaze;

continuing cutting said glaze in accordance with said programmed design to produce said design on said container;

repeating said steps of contacting and cutting for each of said containers until all containers have said design thereon; and removing said containers from said glass cutting machine.

2. A method of producing a design on or in an exterior surface of a terracotta container using a glass cutting machine; said exterior surface being at least partly covered with a glazing material; and said glass cutting machine being programmable and controlled by a computer operatively connected to said glass cutting machine to cut said design in said container; said method comprising the steps of:

inputting said design into said computer;

placing a plurality of containers into said glass cutting machine;

activating said glass cutting machine;

contacting a first container of said plurality containers with a cutting tool of said glass cutting machine;

cutting said glaze on said exterior surface of said first container to remove a portion of said glaze to expose said exterior surface beneath said glaze;

continuing cutting said glaze in accordance with said programmed design to produce said design on said first container;

repeating said steps of contacting and cutting for each of said plurality of containers until all containers have said design thereon; and removing said plurality of containers from said glass cutting machine.

3. The method according to claim 2, wherein said method further comprises the step of:

cutting a portion of said exterior surface of said first container to remove a portion of said exterior surface to form a groove therein, wherein said step of cutting said portion of said exterior surface is performed either:

(A) after removal of said portion of said glaze from said exterior surface; or (B) substantially simultaneously as removal of said portion of said glaze from said exterior surface.

4. The method according to claim 3, wherein said method further comprises repeating said step of cutting a portion of said exterior surface of said first container to remove a portion of said exterior surface to form a groove therein for each of said plurality of containers until all containers have a groove formed therein.

5. The method according to claim 4 wherein the container comprises one of: stone, clay, ceramic, porcelain, or any number of other hard or hardened materials suitable for use as containers.

6. The method according to claim 5 wherein said glass cutting machine comprises Pöting glass cutting machine models SM4 or SM8.

7. The method according to claim 6 wherein said glass cutting machine comprises a glass cutting robot, such as Pöting's Decoration Cutting Robot model SM-R.

8. The method according to claim 7 wherein said computer comprises a cutting program to program said glass cutting machine to a cut said design.

9. The method according to claim 8, wherein said cutting program comprises WINCUT PRO Software.

10. The method according to claim 2 wherein each of said plurality of containers comprises one of: stone, clay, ceramic, porcelain, or any number of other hard or hardened materials suitable for use as containers.

11. The method according to claim 2 wherein said glass cutting machine comprises Pöting glass cutting machine models SM4 or SM8.

12. The method according to claim 2 wherein said glass cutting machine comprises a glass cutting robot, such as Pöting's Decoration Cutting Robot model SM-R.

13. The method according to claim 2 wherein said computer comprises a cutting program to program said glass cutting machine to a cut said design.

14. The method according to claim 13, wherein said cutting program comprises WINCUT PRO Software.

* * * * *